UNITED STATES PATENT OFFICE.

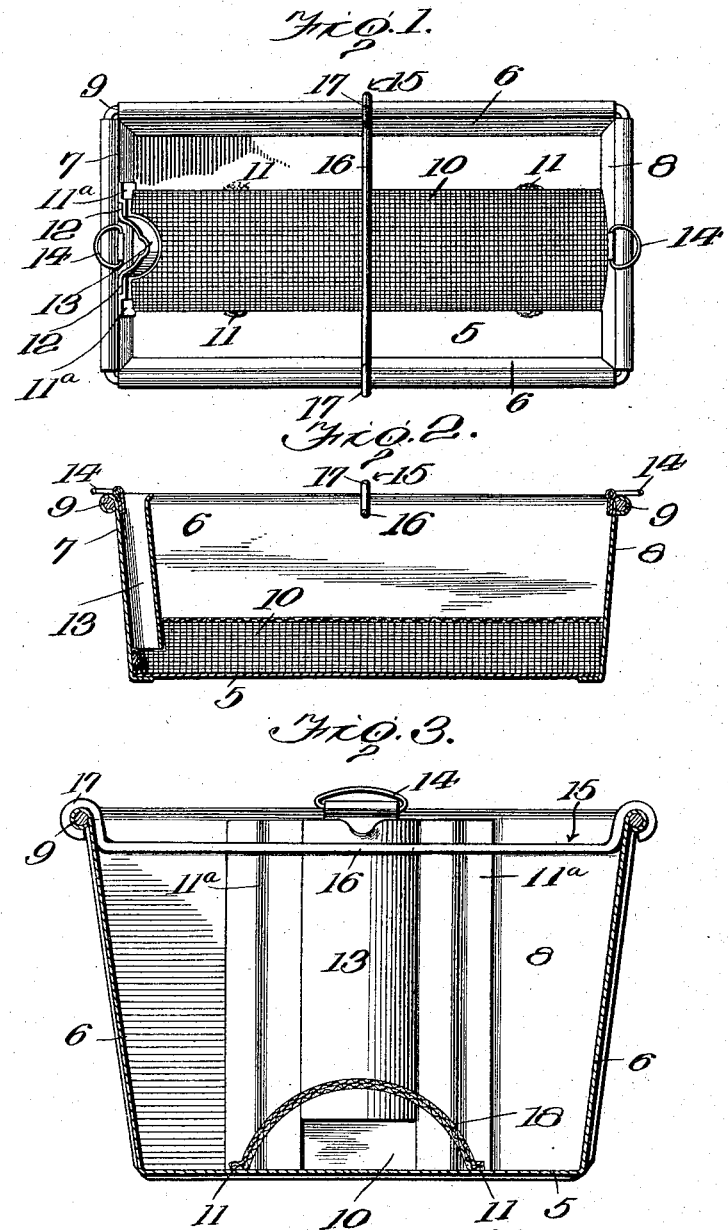
C. F. TILLMANN.
PLANT IRRIGATING DEVICE.
APPLICATION FILED MAY 15, 1916.
1,218,228.
Patented Mar. 6, 1917.
Charles F. Tillmann, Inventor

CHARLES F. TILLMANN, OF CHICAGO, ILLINOIS.

PLANT-IRRIGATING DEVICE.

1,218,228.  Specification of Letters Patent.  Patented Mar. 6, 1917.

Application filed May 15, 1916. Serial No. 97,602.

*To all whom it may concern:*

Be it known that I, CHARLES F. TILLMANN, a citizen of the United States, residing at Chicago, in the county of Cook and State of Illinois, have invented certain new and useful Improvements in Plant-Irrigating Devices, of which the following is a specification.

This invention relates generally to improvements in plant irrigating devices, and more specifically to irrigating devices for flower boxes, flower pots or the like.

One of the principal objects of the invention is to provide an elongated box for holding a plurality of plants, and a perforated conduit extending longitudinally of the box for uniformly directing a supply of water to the roots of all the plants.

Another important object of the invention is to provide a plant box and water conduit of an extremely simple construction, and one which is, therefore, very cheap to manufacture.

Another object of the invention is to provide a conductor which will feed the water to one end of said conduit, the conductor being disposed within the container and extending vertically, the upper end of the conductor being disposed above the conduit so as to create a sufficient pressure to insure the water passing upwardly through the conduit to the roots of the plants.

Another important object of the invention is to provide a plant irrigating device of the character set forth, in which the water conductor is removably attached to the container, whereby the same may be removed to permit two or more of the containers being positioned in nested relation for shipping purposes.

A still further object of the invention is to provide an elongated flower box with a shiftable transverse brace, which, when centrally disposed, will hold the sides of the container against spreading, and which, when shifted to one end of the container, will permit another container to be nested therein.

These and other objects will in part be obvious, and will be hereinafter more fully disclosed.

In the drawings, which show by way of illustration the preferred embodiment of my invention, Figure 1 is a plan view of a plant container.

Fig. 2 is a longitudinal sectional view therethrough, and

Fig. 3 is an enlarged transverse sectional view.

Like reference numerals designate corresponding parts in all the figures of the drawing.

Referring to the drawing, I have shown a commercial elongated sheet metal box of imperforate construction, which comprises a flat bottom 5, inclined side walls 6—6 and inclined end walls 7 and 8 respectively. The upper edges of these walls are curved around a reënforcing wire 9.

Disposed within the container is an elongated strip of wire mesh, and this strip is uniformly arched transversely throughout its entire length to form a centrally disposed and longitudinally extending perforated water conduit 10. This conduit extends from one end wall to the other and has its longitudinal edges secured to the bottom 5 at spaced points by solder 11.

Secured to the inner face of the end wall 7 are spaced guide flanges 11—11. These guide flanges extend vertically and receive the laterally extending flanges 12—12 of a vertically extending arcuate water conductor 13. The lower end of this conductor terminates slightly below the water conduit 10, and the upper end thereof is disposed substantially flush with the upper edge of the wall 7.

Centrally secured to the upper edge of each end wall is a ring 14, by means of which the container may be lifted as desired. The conductor 13 is centrally disposed with respect to the end wall 7, and the flanges 12—12 of said conductor are disposed on opposite sides of the adjacent ring 14, thereby permitting said conductor to be readily removed.

In order to prevent the side walls 6—6 of the container from spreading I have provided a brace 15. This brace consists of a body portion 16, which is disposed a sufficient distance below the top of the container so as to be covered by the earth thereof. The outer ends of this body portion are formed into hooks 17—17 which frictionally engage over the bent upper edges of said side walls.

From the foregoing, it will be seen that I have provided a very simple and cheap flower box by combining an elongated commercial sheet metal box, and a water conduit 10 formed from a strip of commercial wire mesh. When it is desired to nest two or more of these boxes, the water conductor 13 of the receiving box is removed from engagement with the flanges 11 and is placed within the bottom of the box, and the brace 15 is slipped along the sides of the box and positioned against one end thereof, thus permitting the other box to be readily positioned therein. By extending the water conduit centrally along the entire box, I have provided a means whereby the earth and roots disposed within the container will be uniformly moistened throughout the entire length of the container, and by extending the water conductor 13 to the top of the container, I have provided means for forcing the water from the conduit 10 upwardly through the earth disposed within the container.

In order to prevent the earth passing into the pores of the wire mesh and thereby choking the same, a shield 18, which preferably consists of a woven fabric, is placed over said mesh and is preferably secured thereto by any suitable adhesive. This fabric is loosely woven so as to permit the water passing upwardly therethrough and the plant roots passing downwardly therethrough.

Having thus described my invention, what I claim is:

1. In a plant irrigating device, the combination with an elongated container for holding a plurality of plants, of a horizontally disposed water conduit extending centrally and longitudinally across the bottom and having a plurality of water egress openings at points throughout its length for uniformly directing the water to the roots of the plants, means for conducting a supply of water to one end of said conduit, and a porous dirt shield disposed over said conduit.

2. In a plant irrigating device, the combination with a plant container including a flat bottom and a surrounding wall, of a horizontally disposed water conduit extending across the bottom and having a plurality of water egress openings at points throughout its length for uniformly directing the water to the roots of the plant and a vertically extending water conductor disposed within the container and communicating at its lower end with one end of said horizontally disposed conduit for conducting a supply of water thereto, said water conductor being removably secured to the wall of the container to permit another container being nested within said container.

3. In a plant irrigating device, the combination with a commercial elongated plant box including a bottom and spaced side and end walls, of a water conduit extending along the bottom thereof from one end wall to the other, said conduit being formed from an elongated strip of wire mesh and arched upwardly transversely throughout its length, the longitudinal edges thereof being secured to the bottom of the container, and a water conductor for directing water into one end of said conduit, said water conductor being removably attached to one end wall of the container to permit another container being nested within said container.

4. In a plant irrigating device, the combination with an elongated plant container including a bottom and spaced side and end walls, of a perforated water conduit extending along the bottom thereof from one end wall to the other, a water conductor for directing water into said conduit, and a brace connecting the side walls of the container, said water conductor and brace being movably attached to the container to permit another container being nested within said container.

5. In a plant irrigating device, the combination with an elongated plant container including a bottom and spaced side and end walls, of a brace connecting the side walls of the container, said brace being formed from wire and having its body portion disposed below the top of the container, the ends of the wire being bent into hooks for respectively engaging the upper edges of said side walls.

6. In a plant irrigating device, the combination with an elongated container for holding a plurality of plants, and including side walls and end walls, of a horizontally disposed water conduit extending longitudinally across the bottom and having a plurality of water egress openings at points throughout its length, said conduit extending from one end wall to the other, a pair of spaced guiding flanges secured to the inner face of one end wall and extending vertically, and a vertically extending arcuate water conductor having laterally extending flanges slidably engaged with the flanges secured to the end wall of the container, whereby said water conductor may be removed to permit another container to be nested within said container.

In testimony whereof I affix my signature in the presence of two witnesses.

CHARLES F. TILLMANN.

Witnesses:
 EARL F. TILLMANN,
 WILLIAM L. WERNECKE.